(12) United States Patent
Morinaka et al.

(10) Patent No.: US 10,777,847 B2
(45) Date of Patent: Sep. 15, 2020

(54) ELECTROLYTIC SOLUTION FOR NONAQUEOUS ELECTROLYTIC SOLUTION CELL, AND NONAQUEOUS ELECTROLYTIC SOLUTION CELL

(75) Inventors: Takayoshi Morinaka, Ube (JP); Yuki Kondo, Kawagoe (JP)

(73) Assignee: Central Glass Company, Limited, Ube-shi (JP)

( * ) Notice: Subject to any disclaimer, the term of this patent is extended or adjusted under 35 U.S.C. 154(b) by 1011 days.

(21) Appl. No.: 14/238,498

(22) PCT Filed: Aug. 17, 2012

(86) PCT No.: PCT/JP2012/070877
§ 371 (c)(1),
(2), (4) Date: Feb. 12, 2014

(87) PCT Pub. No.: WO2013/031551
PCT Pub. Date: Mar. 7, 2013

(65) Prior Publication Data
US 2014/0193706 A1  Jul. 10, 2014

(30) Foreign Application Priority Data

Aug. 31, 2011 (JP) .................................. 2011-188385

(51) Int. Cl.
*H01M 10/0567* (2010.01)
*H01M 10/0525* (2010.01)
*H01M 10/0568* (2010.01)

(52) U.S. Cl.
CPC ... *H01M 10/0567* (2013.01); *H01M 10/0525* (2013.01); *H01M 10/0568* (2013.01); *H01M 2300/0037* (2013.01); *Y02T 10/7011* (2013.01)

(58) Field of Classification Search
CPC ..... H01M 10/0568; H01M 2300/0037; H01M 10/0567
See application file for complete search history.

(56) References Cited

U.S. PATENT DOCUMENTS

| 5,902,698 | A | 5/1999 | Nie et al. | |
|---|---|---|---|---|
| 5,916,475 | A | 6/1999 | Michot et al. | |
| 6,350,545 | B2 | 2/2002 | Fanta et al. | |
| 6,783,896 | B2 | 8/2004 | Tsujioka et al. | |
| 6,787,267 | B2 | 9/2004 | Tsujioka et al. | |
| 2002/0055045 | A1* | 5/2002 | Michot .................. | C07C 45/46 429/307 |
| 2002/0061450 | A1 | 5/2002 | Tsujioka et al. | |
| 2002/0081496 | A1* | 6/2002 | Tsujioka ................ | C07F 5/022 429/307 |
| 2010/0209782 | A1 | 8/2010 | Choi et al. | |
| 2011/0143212 | A1* | 6/2011 | Angell ............... | H01M 10/0567 429/307 |
| 2011/0151340 | A1* | 6/2011 | Kaskhedikar .......... | H01G 9/038 429/339 |
| 2011/0171539 | A1* | 7/2011 | Patoux .................. | H01M 4/505 429/341 |
| 2011/0256458 | A1* | 10/2011 | Tani ..................... | H01M 10/052 429/338 |
| 2012/0070358 | A1 | 3/2012 | Morinaka et al. | |
| 2012/0288771 | A1* | 11/2012 | Lim ...................... | H01M 4/525 429/338 |

FOREIGN PATENT DOCUMENTS

| EP | 1 195 834 A2 | 4/2002 |
|---|---|---|
| JP | 8-511274 A | 11/1996 |
| JP | 8-339827 A | 12/1996 |
| JP | 3456561 B2 | 12/1996 |
| JP | 2000-123867 A | 4/2000 |
| JP | 3722685 B2 | 4/2002 |
| JP | 2002-373703 A | 12/2002 |
| JP | 2003-68359 A | 3/2003 |
| JP | 2003-532619 A | 11/2003 |
| JP | 4367015 B2 | 1/2005 |
| JP | 2007182410 A * | 7/2007 |
| JP | 2010-73367 A | 4/2010 |
| JP | 2010-135166 A | 6/2010 |

(Continued)

OTHER PUBLICATIONS

H. V. Venkatasetty and Y. U. Jeong, Recent Advances in Lithium-Ion and Lithium-Polymer Batteries, IEEE, 173-178 (Year: 2002).*
Translation of WO 2012161305 (Year: 2011).*
Scheers et al, Novel Lithium Imides; Effects of—F,—CF3, and—C—=N Substituents on Lithium Battery Salt Stability and Dissociation, Electrochemistry, 80(1), 18-25 (2012), Published Dec. 27, 2011 (Year: 2011).*
JP-2007182410-A English machine translation (Year: 2007).*
Japanese Office Action dated May 12, 2015 (six pages).
European Search Report dated Apr. 14, 2015 (six pages).
Chen, Zonghai et al., "$LiPF_6$/LiBOB blend salt electrolyte for high-power lithium-ion batteries," Electrochimica Acta 51, 2006, pp. 3322-3326, Elsevier Ltd.
Liu, Jun et al., "Lithium difluoro(oxalato)borate as a functional additive for lithium-ion batteries," Electrochemistry Communications 9, 2007, pp. 475-479, Elsevier B.V.

(Continued)

*Primary Examiner* — Scott J. Chmielecki
(74) *Attorney, Agent, or Firm* — Crowell & Moring LLP

(57) ABSTRACT

Disclosed is an electrolyte for nonaqueous electrolyte cells, which contains a nonaqueous organic solvent and a solute. This electrolyte is characterized by containing as additives at least one compound selected from a first compound group consisting of bis(oxalato)borate, difluoro(oxalato)borate, tris(oxalato)phosphate, difluorobis(oxalato)phosphate, and tetrafluoro(oxalato)phosphate, and at least one compound selected from a second compound group consisting of a sulfonate group-containing imide salt, which is represented by the general formula $M[R^1OSO_2NSO_2OR^2]_n$, and a phosphoryl group-containing imide salt, which is represented by the general formula $M[R^3R^4OPNPOR^5R^6]_n$. This electrolyte provides nonaqueous electrolyte cells with high-temperature durability without causing swelling and performance deterioration of batteries.

6 Claims, No Drawings

(56) References Cited

FOREIGN PATENT DOCUMENTS

| | | | |
|---|---|---|---|
| JP | 2010-192430 A | 9/2010 | |
| JP | 2010-238504 A | 10/2010 | |
| JP | 2011-54406 A | 3/2011 | |
| WO | WO 2010/140580 A1 | 12/2010 | |
| WO | WO-2012161305 A1 * | 11/2012 | .......... H01M 10/052 |

OTHER PUBLICATIONS

Qin, Yan et al., "Lithium Tetrafluoro Oxalato Phosphate as Electrolyte Additive for Lithium-Ion Cells," Electrochemical and Solid-State Letters, 2010, pp. A11-A14, The Electrochemical Society.
International Search Report (PCT/ISA/210) with English translation thereof dated Nov. 6, 2012 {Five (5) pages}.

* cited by examiner

ELECTROLYTIC SOLUTION FOR NONAQUEOUS ELECTROLYTIC SOLUTION CELL, AND NONAQUEOUS ELECTROLYTIC SOLUTION CELL

TECHNICAL FIELD

The present invention relates to an electrolyte for nonaqueous electrolyte cells, which provides nonaqueous electrolyte cells with high-temperature durability, and a nonaqueous electrolyte cell using the same.

BACKGROUND OF THE INVENTION

In recent years, attention is attracted to storage systems directed to small-size, high-energy density uses, such as information-related devices and communication devices, that is, personal computers, video cameras, digital still cameras, cellular phones, etc., storage systems directed to large-size, power uses, such as electric vehicles, hybrid vehicles, fuel cell vehicle's auxiliary power supplies, power storage, etc. As one candidate therefor, nonaqueous electrolyte cells, such as lithium ion cells, lithium cells, lithium ion capacitors, etc., have actively been developed.

Of these nonaqueous electrolyte cells, there are many already put into practical use, but they are not satisfactory in various uses with respect to durability. Deterioration is severe, particularly when the environmental temperature is 45° C. or higher. Therefore, it is problematic in the use for being used in a high-temperature place for a long term, such as automotive use.

In general, in these nonaqueous electrolyte cells, a nonaqueous electrolyte or a nonaqueous electrolyte coagulated by a gelation agent is used as an ionic conductor. Its structure is as follows. As a solvent, there is used an aprotic solvent, for example, one type or a mixed solvent of several types selected from ethylene carbonate, propylene carbonate, dimethyl carbonate, diethyl carbonate, ethyl methyl carbonate, etc. As a solute, there is used a lithium salt, that is, $LiPF_6$, $LiBF_4$, $(CF_3SO_2)_2NLi$, $(C_2F_5SO_2)_2NLi$, etc.

Hitherto, there have been studied the optimizations of various cell components, including active materials of cathode and anode, as means for improving durability, such as nonaqueous electrolyte cell's cycle characteristics, high-temperature storage stability, etc. Nonaqueous electrolyte-related technology is not an exception, either. There are proposals to make various additives suppress deterioration caused by the decomposition of an electrolyte on the surface of an active cathode or anode. For example, Patent Publication 1 proposes improving cell characteristics by adding vinylene carbonate to an electrolyte. This method prevents an electrolyte from decomposing on the surface of an electrode by coating the electrode with a polymer film by polymerization of vinylene carbonate. It is, however, also difficult for lithium ions to pass through this film, thereby increasing internal resistance. It is a task that input and output characteristics are disadvantageous.

Non-patent Publications 1-3 and Patent Publications 2 and 3 describe that, when adding boron and phosphorus complex salts having oxalic acid group to electrolytes, high-temperature cycle characteristics and output characteristics improve by the effects of films that are formed on electrode interfaces. However, their effects are not yet sufficient. Furthermore, when increasing the amounts of these complex salts having oxalic acid group, there is a risk that gas is generated by decomposition reactions other than the film-forming reaction to cause swelling and performance deterioration of batteries. When decreasing the amount of addition to prevent this, it becomes impossible to obtain the effect. It is a task.

Furthermore, Patent Publication 4 describes the use of an imide salt having a sulfonic acid ester group as an electrolyte, but does not describe the improvement of characteristics by the use as an additive.

Furthermore, Patent Publication 5 describes that, when using as an electrolyte an imide salt having a sulfonic acid ester group containing fluorine atoms, high voltage stability improves. The effect is, however, not yet sufficient, and there is no description about cycle characteristics.

Patent Publication 6 describes that a phosphoryl imide salt shows a good anticorrosive property as an electrolyte against aluminum as a cathode collector, but there is no proved examples. Furthermore, there is no description about the gas generation suppression effect by the addition.

PRIOR ART PUBLICATIONS

Patent Publications

Patent Publication 1: Japanese Patent Application Publication 2000-123867
Patent Publication 2: Japanese Patent 3722685
Patent Publication 3: Japanese Patent 4367015
Patent Publication 4: Japanese Patent Application Publication 2003-532619
Patent Publication 5: Japanese Patent 3456561
Patent Publication 6: Japanese Patent Application Publication Heisei 8-511274

Non-Patent Publications

Non-patent Publication 1: Electrochim. Acta, 51, pages 3322-3326 (2006)
Non-patent Publication 2: Electrochemistry Communications, 9, pages 475-479 (2007)
Non-patent Publication 3: Electrochemical and Solid-State Letters, 13 (2), pages A11-A14 (2007)

SUMMARY OF THE INVENTION

The present invention provides an electrolyte for nonaqueous electrolyte cells and a nonaqueous electrolyte cell, in which durability of this type of nonaqueous electrolyte cell, such as high-temperature cycle characteristics, storage stability at high temperatures of 45° C. or higher, etc., is improved, and which can be used for storage systems directed to large-size, power uses, such as electric vehicles, hybrid vehicles, fuel cell vehicle's auxiliary power supplies, power storage, etc., particularly without causing swelling and performance deterioration of batteries due to the gas generation accompanying decomposition reactions of components contained in the electrolyte.

As a result of an eager study in view of such problem, in nonaqueous electrolyte cells equipped with a cathode, an anode made of lithium or an anode material capable of storing and releasing lithium, and an electrolyte for nonaqueous electrolyte cells, the inventors have found an electrolyte for nonaqueous electrolyte cells that is capable of improving cycle characteristics, high-temperature storage stability, etc. by using an electrolyte for nonaqueous electrolyte cells, which has been prepared by adding a specific compound group, and a nonaqueous electrolyte cell using the same, thereby achieving the present invention.

That is, the present invention provides an electrolyte for nonaqueous electrolyte cells, which contains a nonaqueous organic solvent and a solute, the electrolyte (first electrolyte) for nonaqueous electrolyte cells being characterized by containing as additives at least one compound selected from a first compound group consisting of bis(oxalato)borate, difluoro(oxalato)borate, tris(oxalato)phosphate, difluorobis(oxalato)phosphate, and tetrafluoro(oxalato)phosphate, and at least one compound selected from a second compound group consisting of a sulfonate group-containing imide salt (in the following, it may be mentioned as an imide sulfate or simply an imide salt), which is represented by the following general formula (I), $$M[R^1OSO_2NSO_2OR^2]_n \quad (1)$$

[In the formula, each of $R^1$ and $R^2$ independently represents at least one organic group selected from a $C_{1-10}$ straight chain or branched alkyl group or alkenyl group, a $C_{3-10}$ cycloalkyl group or cycloalkenyl group, and a $C_{6-10}$ aryl group, and a fluorine atom, an oxygen atom, and/or an unsaturated bond may exist in the organic group. M represents an alkali metal cation, an alkali earth metal cation or an onium cation, and n represents an integer equal to valence of the corresponding cation.] and a phosphoryl group-containing imide salt (in the following, it may be mentioned as a phosphoryl imide or simply an imide salt) represented by the following general formula (II), $$M[R^3R^4OPNPOR^5R^6]_m \quad (II)$$

[In the formula, each of $R^3$, $R^4$, $R^5$ and $R^6$ independently represents chlorine, fluorine or an organic group represented by $-OR^7$; and $R^7$ represents at least one organic group selected from a $C_{1-10}$ straight chain or branched alkyl group or alkenyl group, a $C_{3-10}$ cycloalkyl group or cycloalkenyl group, and a $C_{6-10}$ aryl group, and a fluorine atom, an oxygen atom, and/or an unsaturated bond may exist in the organic group. M represents an alkali metal cation, an alkali earth metal cation or an onium cation, and m represents an integer equal to valence of the corresponding cation.]

The first electrolyte may be an electrolyte (second electrolyte) for nonaqueous electrolyte cells, wherein addition of the first compound group is in a range of 0.01-5.0 mass % relative to the electrolyte for nonaqueous electrolyte cells.

The first or second electrolyte may be an electrolyte (third electrolyte) for nonaqueous electrolyte cells, wherein addition of the second compound group is in a range of 0.01-10.0 mass % relative to the electrolyte for nonaqueous electrolyte cells.

Any one of the first to third electrolytes may be an electrolyte (fourth electrolyte) for nonaqueous electrolyte cells, wherein a countercation of the first compound group is at least one countercation selected from the group consisting of lithium ion, sodium ion, potassium ion, and tetraalkylammonium ion.

Any one of the first to fourth electrolytes may be an electrolyte (fifth electrolyte) for nonaqueous electrolyte cells, wherein the solute is at least one solute selected from the group consisting of $LiPF_6$, $LiBF_4$, $(CF_3SO_2)_2NLi$, and $(C_2F_5SO_2)_2NLi$.

Furthermore, the present invention provides a nonaqueous electrolyte cell equipped with at least a cathode, an anode comprising lithium or an anode material capable of storing and releasing lithium, and an electrolyte for nonaqueous electrolyte cells, the nonaqueous electrolyte cell being characterized by using any one of the first to fifth electrolytes.

Advantageous Effect of the Invention

An electrolyte for nonaqueous electrolyte cells of the present invention can improve electrode's film characteristics and can improve durability such as cycle characteristics and storage stability at high temperatures of 45° C. or higher of nonaqueous electrolyte cells using the same, etc., without causing swelling and performance deterioration of batteries due to the gas generation accompanying decomposition reactions of components contained in the electrolyte. Therefore, an electrolyte for nonaqueous electrolyte cells of the present invention can be used for cells of storage systems, etc. directed to large-size, power uses, such as electric vehicles, hybrid vehicles, fuel cell vehicle's auxiliary power supplies, power storage, etc.

The at least one compound selected from the first compound group consisting of bis(oxalato)borate, difluoro(oxalato)borate, tris(oxalato)phosphate, difluorobis(oxalato)phosphate, and tetrafluoro(oxalato)phosphate decomposes on the cathode and the anode, thereby forming a film having a high lithium ion conductivity. This film suppresses a direct contact between the active material and the nonaqueous organic solvent or the solute to prevent its decomposition and suppress deterioration of the cell. The use of only the first compound group, however, causes a problem that there is a loss in the film formation to generate side reactions other than the film formation, resulting in decomposition of the oxalic acid moiety of the additive to turn to carbon dioxide or carbon monoxide, thereby causing a gas generation in the cell. In the electrolyte for nonaqueous electrolyte cells of the present invention, both of at least one compound selected from the first compound group and at least one imide salt selected from the second compound group are added. With this, the first compound group is efficiently fixed by a less amount as a film on the electrode to suppress the gas generation. Furthermore, it shows a superior durability that is not achievable by a single use of the first compound group or the second compound group.

An electrolyte for nonaqueous electrolyte cells of the present invention contains the first compound group, the second compound group, a nonaqueous organic solvent, and a solute. Furthermore, according to need, it is also possible to use another additive together that is well known in general.

In the following, each constituent element of an electrolyte for nonaqueous electrolyte cells of the present invention is explained in detail.

The first compound group used in the present invention is a compound group consisting of bis(oxalato)borate, difluoro(oxalato)borate, tris(oxalato)phosphate, difluorobis(oxalato)phosphate, and tetrafluoro(oxalato)phosphate. Each salt has an anion moiety of a structure shown in the following.

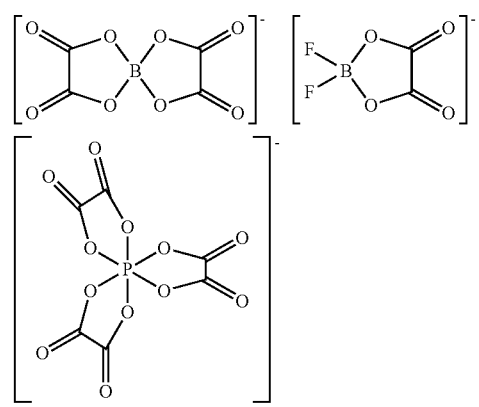

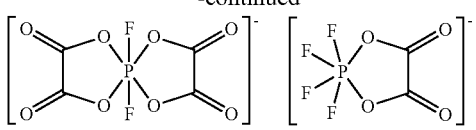

As countercations to be combined with these anions, it is possible to select various ones without a particular limitation on the type, unless they damage performances of the electrolyte for nonaqueous electrolyte cells and the nonaqueous electrolyte cell of the present invention.

As specific examples, it is possible to mention metal cations, such as lithium, sodium, potassium, rubidium, cesium, magnesium, calcium, barium, silver, copper, iron, etc., and onium cations, such as tetraalkylammonium, tetraalkylphosphonium, imidazorium derivatives, etc. In particular, from the viewpoint of playing a role of promoting ionic conduction in nonaqueous electrolyte cells, lithium ion, sodium ion, potassium ion, and tetraalkylammonium ion are preferable.

As to the amount of the first compound group to be added, the lower limit is 0.01 mass % or higher, preferably 0.03 mass % or higher, and more preferably 0.05 mass % or higher, and the upper limit is 5.0 mass % or lower, preferably 3.0 mass % or lower, more preferably 2.0 mass % or lower, relative to the electrolyte for nonaqueous electrolyte cells. If it is less than 0.01 mass %, there is a risk that the effect of improving durability, such as the nonaqueous electrolyte cell's cycle characteristics, high-temperature storage stability, etc., is not sufficiently obtained. On the other hand, if it exceeds 5.0 mass %, there is a risk of having a problem that the compound of this first compound group left over by not having been used in the film formation generates gas by decomposition reactions other than the film-forming reaction to cause swelling and performance deterioration of batteries.

The addition amount of the second compound group used in the present invention is in a range of from 0.01 mass % to 10.0 mass %, preferably from 0.03 mass % to 5.0 mass %, more preferably from 0.05 mass % to 2.0 mass %, relative to the electrolyte for nonaqueous electrolyte cells. If it is less than 0.01 mass %, there is a risk that the effect of improving durability, such as the nonaqueous electrolyte cell's cycle characteristics, high-temperature storage stability, etc., and the effect of suppressing the gas generation are not sufficiently obtained. On the other hand, even if it exceeds 10.0 mass %, it is not possible to expect the increase of the effect corresponding to the addition amount, resulting in a disadvantage from an aspect of the cost. Furthermore, it may cause a case in which the total amount of the imide salt is not dissolved, and the undissolved portion exists in the electrolyte. Therefore, it is not preferable.

The addition proportion of the first compound group and the second compound group is not particularly limited. The molar ratio of the first compound group/the second compound group in the electrolyte for nonaqueous electrolyte cells is in a range in which the lower limit is 0.01 or higher, preferably 0.1 or higher, and in which the upper limit is 100 or lower, preferably 10 or lower. If the range of the molar ratio exceeds 100, there is a risk that the high-temperature durability improvement effect and the gas generation suppression effect are not sufficiently obtained. Furthermore, if it is less than 0.01, there is a risk that the high-temperature durability improvement effect is not sufficiently obtained. Therefore, it is not preferable.

In the electrolyte for nonaqueous electrolyte cells of the present invention, there are not clear details of the mechanism of a striking improvement of cell characteristics, particularly high-temperature durability, by using both of the first compound group and the second compound group, as compared with the case of singly adding one of them. However, both compound groups form a film on the electrode to prevent decomposition of the electrolyte for nonaqueous electrolyte cells by oxidation-reduction and suppress its deterioration, thereby improving the high-temperature durability. Furthermore, in the case of these two types of compound groups being coexistent, a stronger protecting film is produced by a mixed film made from these two types of compound groups.

The type of the nonaqueous organic solvent used in the electrolyte for nonaqueous electrolyte cells of the present invention is not particularly limited, and it is possible to use an arbitrary nonaqueous organic solvent. As specific examples, it is possible to mention cyclic carbonates such as propylene carbonate, ethylene carbonate and butylene carbonate, chain carbonates such as diethyl carbonate, dimethyl carbonate and methyl ethyl carbonate, cyclic esters such as γ-butyrolactone and γ-valerolactone, chain esters such as methyl acetate and methyl propionate, cyclic ethers such as tetrahydrofuran, 2-methyltetrahydrofuran and dioxane, chain ethers such as dimethoxyethane and diethyl ether, sulfur-containing nonaqueous organic solvents such as dimethylsulfoxide and sulfolane, etc. Furthermore, as to the nonaqueous organic solvent used in the present invention, it is acceptable to use one type alone or at least two types by mixing them by an arbitrary combination and an arbitrary proportion according to the use.

The type of the solute used in the electrolyte for nonaqueous electrolyte cells of the present invention is not particularly limited. It is possible to use an arbitrary lithium salt. As specific examples, it is possible to mention electrolyte lithium salts exemplified by $LiPF_6$, $LiBF_4$, $LiClO_4$, $LiAsF_6$, $LiSbF_6$, $LiCF_3SO_3$, $LiN(SO_2CF_3)_2$, $LiN(SO_2C_2F_5)_2$, $LiN(SO_2CF_3)(SO_2C_4F_9)$, $LiC(SO_2CF_3)_3$, $LiPF_3(C_3F_7)_3$, $LiB(CF_3)_4$, $LiBF_3(C_2F_5)$, etc. As to these solutes, it is acceptable use one type alone or at least two types by mixing them by an arbitrary combination and an arbitrary proportion according to the use. In particular, in view of energy density, output characteristics, lifetime, etc. as a cell, $LiPF_6$, $LiBF_4$, $(CF_3SO_2)_2NLi$, and $(C_2F_5SO_2)_2NLi$ are preferable.

The concentrations of these solutes are not particularly limited. The lower limit is 0.5 mol/L or higher, preferably 0.7 mol/L or higher, more preferably 0.9 mol/L or higher, and the upper limit is in a range of 2.5 mol/L or lower, preferably 2.2 mol/L or lower, more preferably 2.0 mol/L or lower. If it is lower than 0.5 mol/L, there is a risk of lowering of cycle characteristics of the nonaqueous electrolyte cell due to lowering of ionic conductivity. On the other hand, if it exceeds 2.5 mol/L, viscosity of the electrolyte for nonaqueous electrolyte cells increases. This also lowers ion conduction, causing a risk of lowering cycle characteristics of the nonaqueous electrolyte cell.

The above is an explanation of a basic structure of an electrolyte for nonaqueous electrolyte cells of the present invention. Unless detracting from the gist of the present invention, it is acceptable to add other additives at arbitrary proportions that are generally used, to the electrolyte for nonaqueous electrolyte cells of the present invention. As specific examples, it is possible to mention compounds having the overcharge prevention effect, the anode film forming effect and the cathode protecting effect, such as cyclohexylbenzene, biphenyl, t-butylbenzene, vinylene carbonate, vinyl ethylene carbonate, difluoroanisole, fluoroethylene carbonate, propane sultone, dimethyl vinylene carbonate, etc. Furthermore, similar to the case of being used for a nonaqueous electrolyte cell called a lithium polymer cell, it is also possible to use the electrolyte for nonaqueous electrolyte cells by coagulating that by a gelation agent or a crosslinking polymer.

Next, the structure of a nonaqueous electrolyte cell of the present invention is explained. A nonaqueous electrolyte cell of the present invention is characterized by using the above-mentioned electrolyte for nonaqueous electrolyte cells of the present invention. For other constituent members, those used in general nonaqueous electrolyte cells are used. That is, it is made up of a cathode and an anode which are capable of storing and releasing lithium, a collector, a separator, a container, etc.

The anode material is not particularly limited. Lithium metal, an alloy or intermetallic compound of lithium and another metal, various carbon materials, artificial graphite, natural graphite, metal oxides, metal nitrides, activated carbon, conductive polymers, etc., which are capable of storing and releasing lithium, are used.

The cathode material is not particularly limited. In the case of lithium cells and lithium ion cells, there are used, for example, lithium-containing transition metal complex oxides, such as $LiCoO_2$, $LiNiO_2$, $LiMnO_2$ and $LiMn_2O_4$, ones having several kinds of transition metals in those lithium-containing transition metal complex oxides, ones having another metal replacing a part of the transition metal in those lithium-containing transition metal complex oxides, oxides such as $TiO_2$, $V_2O_5$ and $MoO_3$, sulfides such as $TiS_2$ and FeS, or conductive polymers such as polyacetylene, polyparaphenylene, polyaniline and polypyrrole, activated carbon, polymers to generate radicals, carbon materials, etc.

Acetylene black, Ketjenblack, carbon fibers or graphite as a conductive material, and polytetrafluoroethylene, polyvinylidene fluoride, SBR resin or the like as a binding agent are added to the cathode and anode materials. Then, they are turned into electrode sheets by forming into sheets.

As a separator for avoiding the contact between the cathode and the anode, there is used an unwoven cloth or porous sheet made of polypropylene, polyethylene, paper, glass fibers, etc.

The above-mentioned respective elements are assembled into a nonaqueous electrolyte cell in the form of coin, cylinder, rectangle, aluminum laminated sheet, etc.

EXAMPLES

In the following, the present invention is explained in detail by examples, but the present invention is not limited by such examples.

Example 1

There was prepared an electrolyte for nonaqueous electrolyte cells to contain, in a mixed solvent having a volume ratio of ethylene carbonate to ethyl methyl carbonate of 3:7, 1.0 mol/L of $LiPF_6$ as a solute, 1.0 mass % of lithium difluorobis(oxalato)phosphate as the first compound group, 0.5 mass % of lithium bis(ethylsulfonato)imide as the second compound group. The molar addition ratio of the first compound group/the second compound group was 1.9.

Using this electrolyte for nonaqueous electrolyte cells, a cell was prepared by using $LiCoO_2$ as the cathode material and graphite as the anode material. A charge-discharge test of the cell was actually conducted. A test cell was prepared as follows.

5 parts by mass of polyvinylidene fluoride (PVDF) as a binder and 5 parts by mass of acetylene black as a conductive material were mixed with 90 parts by mass of $LiCoO_2$ powder, followed by adding N-methylpyrrolidone to make a paste. This paste was applied onto an aluminum foil, followed by drying to make a test cathode body. Furthermore, 10 parts by mass of polyvinylidene fluoride (PVDF) as a binder was mixed with 90 parts by mass of a graphite powder, followed by adding N-methylpyrrolidone to make a slurry. This slurry was applied onto a copper foil, followed by drying at 150° C. for 12 hours to make a test anode body. Then, a 50 mAh cell with an aluminum-laminated outer covering was assembled by using a polyethylene separator which impregnated with the electrolyte.

A charge-discharge test was conducted at an environmental temperature of 60° C. by using the cell prepared by the above method to evaluate cycle characteristics and storage characteristics. Charge was conducted until 4.2 V, and discharge was conducted until 3.0 V. By a constant current/constant voltage method, a 1C (1C is defined as the current value at which the rated capacity by the discharge capacity at a rate of one hour is discharged by one hour, and it is the same in the following) charge-discharge cycle was repeated. The value expressed by percentage of the discharge capacity after 500 cycles relative to the initial discharge capacity was defined as capacity retention. After 500 cycles, a charge was conducted at 0.2 C by a constant current/constant voltage method until a charge upper limit voltage of 4.2 V at an environmental temperature of 25° C. Then, it was stored at an environmental temperature of 60° C. for ten days. After that, a discharge was conducted until a discharge termination voltage of 3.0 V at a constant current of 0.2 C. The ratio of this discharge capacity relative to the initial discharge capacity was defined as remaining capacity ratio to evaluate the storage characteristic of the cell. Furthermore, the amount of gas generated was evaluated by a float method using silicone oil. The results are shown in Table 1.

In Examples 2 to 18 and Comparative Examples 1 to 15, charge-discharge tests were conducted by similarly preparing electrolytes for nonaqueous electrolyte cells and producing cells, except in that the compounds selected from the first compound group and the second compound group and their addition amounts (mass %) were changed in the above-mentioned Example 1. The results compiled are shown in Table 1. The first/the second in Table refers to the molar ratio of the first compound group/the second compound group.

TABLE 1

| | Upper row: first compound group<br>Lower row: conc. (mass %) | Upper row: second compound group<br>Lower row: conc. (mass %) | First/second molar ratio | Capacity retention after cycles % | Remaining capacity ratio % | Generated gas amount after cycles ml |
|---|---|---|---|---|---|---|
| Ex. 1 | Lithium difluorobis(oxalato)phosphate<br>1.0 | Lithium bis(ethylsulfonato)imide<br>0.5 | 1.9 | 64.1 | 48.1 | 1.1 |
| Ex. 2 | Lithium difluorobis(oxalato)phosphate<br>1.0 | Lithium bis(isopropylsulfonato)imide<br>0.5 | 2.1 | 63.0 | 49.1 | 1.8 |
| Ex. 3 | Lithium difluorobis(oxalato)phosphate<br>1.0 | Lithium bis(1,1,1,3,3,3-hexafluoroisopropylsulfonato)imide<br>0.5 | 3.8 | 68.9 | 56.5 | 1.7 |
| Ex. 4 | Lithium difluoro(oxalato)borate<br>1.0 | Lithium bis(2,2,2-trifluoroethylsulfonato)imide<br>1.0 | 2.4 | 69.3 | 59.6 | 1.7 |
| Ex. 5 | Lithium bis(oxalato)borate<br>0.03 | Lithium bis(1,1,1,3,3,3-hexafluoroisopropylsulfonato)imide<br>0.05 | 1.5 | 59.1 | 48.7 | 1.3 |
| Ex. 6 | Lithium tris(oxalato)phosphate<br>0.05 | Lithium bis(1,1,1,3,3,3-hexafluoroisopropylsulfonato)imide<br>1.0 | 0.08 | 61.6 | 52.2 | 0.9 |
| Ex. 7 | Lithium tetrafluoro(oxalato)phosphate<br>5.0 | Lithium bis(1,1,1,3,3,3-hexafluoroisopropylsulfonato)imide<br>1.0 | 12 | 69.6 | 58.6 | 2.9 |
| Ex. 8 | Sodium difluorobis(oxalato)phosphate<br>0.5 | Lithium bis(1,1,1,3,3,3-hexafluoroisopropylsulfonato)imide<br>5.0 | 0.18 | 62.1 | 55.9 | 2.1 |
| Ex. 9 | Triethylmethylammonium difluorobis(oxalato)phosphate<br>0.03 | Lithium bis(1,1,1,3,3,3-hexafluoroisopropylsulfonato)imide<br>1.0 | 0.04 | 55.3 | 46.3 | 0.7 |
| Ex. 10 | Potassium difluorobis(oxalato)phosphate<br>0.5 | Lithium bis(1,1,1,3,3,3-hexafluoroisopropylsulfonato)imide<br>1.0 | 0.85 | 58.2 | 51.2 | 1.0 |
| Ex. 11 | Lithium difluorobis(oxalato)phosphate<br>1.0 | Lithium bis(difluorophosphoryl)imide<br>0.5 | 1.5 | 70.2 | 63.3 | 1.2 |
| Ex. 12 | Lithium difluorobis(oxalato)phosphate<br>1.0 | Lithium bis(diphenylphosphonato)imide<br>0.5 | 3.9 | 66.7 | 59.1 | 2.2 |
| Ex. 13 | Lithium difluorobis(oxalato)phosphate<br>1.0 | Lithium bis(diethylphosphonato)imide<br>0.5 | 2.3 | 69.1 | 47.8 | 1.5 |
| Ex. 14 | Lithium difluoro(oxalato)borate<br>1.5 | Potassium bis(di-1,1,1,3,3,3-hexafluoroisopropylphosphonato)imide<br>0.1 | 85 | 69.3 | 52.0 | 1.5 |
| Ex. 15 | Lithium difluorobis(oxalato)phosphate<br>0.005 | Lithium bis(1,1,1,3,3,3-hexafluoroisopropylsulfonato)imide<br>1.0 | 0.01 | 46.0 | 35.7 | 0.8 |
| Ex. 16 | Lithium difluorobis(oxalato)phosphate<br>1.0 | Lithium bis(1,1,1,3,3,3-hexafluoroisopropylsulfonato)imide<br>11.0 | 0.17 | 53.3 | 42.9 | 1.7 |
| Ex. 17 | Lithium difluoro(oxalato)borate<br>6.0 | Lithium bis(2,2,2-trifluoroethylsulfonato)imide<br>1.0 | 15 | 49.7 | 44.1 | 3.9 |
| Ex. 18 | Lithium difluoro(oxalato)borate<br>1.0 | Triethylmethylammonium bis(2,2,2-trifluoroethylsulfonato)imide<br>0.005 | 635 | 64.2 | 48.1 | 3.0 |
| Com. Ex. 1 | —<br>0 | —<br>0 | — | 39.0 | 29.2 | 1.1 |
| Com. Ex. 2 | Lithium difluorobis(oxalato)phosphate<br>1.0 | —<br>0 | — | 62.3 | 44.0 | 3.8 |
| Com. Ex. 3 | Lithium difluoro(oxalato)borate<br>1.0 | —<br>0 | — | 61.9 | 44.2 | 3.2 |

TABLE 1-continued

| | Upper row: first compound group<br>Lower row: conc. (mass %) | Upper row: second compound group<br>Lower row: conc. (mass %) | First/<br>second<br>molar<br>ratio | Capacity<br>retention<br>after<br>cycles<br>% | Remaining<br>capacity<br>ratio<br>% | Generated<br>gas amount<br>after<br>cycles<br>ml |
|---|---|---|---|---|---|---|
| Com.<br>Ex. 4 | Lithium bis(oxalato)borate<br>0.03 | —<br>0 | — | 52.0 | 32.8 | 2.1 |
| Com.<br>Ex. 5 | Lithium tris(oxalato)phosphate<br>0.05 | —<br>0 | — | 53.9 | 41.1 | 2.5 |
| Com.<br>Ex. 6 | Lithium tetrafluoro(oxalato)phosphate<br>5.0 | —<br>0 | — | 63.1 | 47.3 | 5.6 |
| Com.<br>Ex. 7 | Sodium difluorobis(oxalato)phosphate<br>0.5 | —<br>0 | — | 60.1 | 41.8 | 3.0 |
| Com.<br>Ex. 8 | —<br>0 | Lithium bis(ethylsulfonato)imide<br>1.0 | — | 38.1 | 28.9 | 0.9 |
| Com.<br>Ex. 9 | —<br>0 | Lithium bis(isopropylsulfonato)imide<br>1.0 | — | 40.2 | 35.2 | 0.8 |
| Com.<br>Ex. 10 | —<br>0 | Lithium bis(2,2,2-trifluoroethyl-<br>sulfonato)imide<br>1.0 | — | 45.5 | 32.3 | 0.8 |
| Com.<br>Ex. 11 | —<br>0 | Lithium<br>bis(1,1,1,3,3,3-hexafluoroisopropyl-<br>sulfonato)imide<br>1.0 | — | 44.8 | 31.5 | 0.8 |
| Com.<br>Ex. 12 | —<br>0 | Lithium bis(difluorophosphoryl)imide<br>0.5 | — | 50.1 | 41.0 | 0.9 |
| Com.<br>Ex. 13 | —<br>0 | Lithium bis(diphenylphosphonato)imide<br>0.5 | — | 49.4 | 33.8 | 1.3 |
| Com.<br>Ex. 14 | —<br>0 | Lithium bis(diethylphosphonato)imide<br>0.5 | — | 39.9 | 33.7 | 1.3 |
| Com.<br>Ex. 15 | —<br>0 | Potassium<br>bis(di-1,1,1,3,3,3-hexafluoroisopropyl-<br>phosphonato)imide<br>0.1 | — | 42.8 | 38.5 | 0.9 |

As the above results are compared, it is understood that both of capacity retention and storage characteristic in the case of using both of the first compound group and the second compound group are superior to those in the case of singly using the first compound group or the second compound group. Furthermore, the second compound group suppresses the gas generation by the decomposition reaction of the first compound group.

The invention claimed is:

1. An electrolyte for nonaqueous electrolyte cells, which contains a nonaqueous organic solvent and a solute,
   wherein the electrolyte for nonaqueous electrolyte cells contains as additives:
   at least one compound selected from a first compound group consisting of bis(oxalato)borate, difluoro(oxalato)borate, tris(oxalato)phosphate, difluorobis(oxalato)phosphate, and tetrafluoro(oxalato)phosphate; and
   at least one compound selected from a second compound group consisting of
   a phosphoryl group-containing imide salt represented by the following general formula (II):

$$M[R^3R^4OPNPOR^5R^6]_m \quad (II)$$

wherein each of $R^3$, $R^4$, $R^5$ and $R^6$ independently represents chlorine, fluorine or an organic group represented by —$OR^7$; and $R^7$ represents at least one organic group selected from a $C_{1-10}$ straight chain or branched alkyl group or alkenyl group, a $C_{3-10}$ cycloalkyl group or cycloalkenyl group,
   a $C_{6-10}$ aryl group, and a fluorine atom, an oxygen atom, and/or an unsaturated bond may exist in the organic group,
   M represents an alkali metal cation, an alkali earth metal cation or an onium cation, and
   m represents an integer equal to valence of the corresponding cation.

2. The electrolyte for nonaqueous electrolyte cells as claimed in claim 1, wherein addition of the first compound group is in a range of 0.01-5.0 mass % relative to the electrolyte for nonaqueous electrolyte cells.

3. The electrolyte for nonaqueous electrolyte cells as claimed in claim 1, wherein a countercation of the first compound group is at least one countercation selected from the group consisting of lithium ion, sodium ion, potassium ion, and tetraalkylammonium ion.

4. The electrolyte for nonaqueous electrolyte cells as claimed in claim 1, wherein the solute is at least one solute selected from the group consisting of $LiPF_6$, $LiBF_4$, $(CF_3SO_2)_2NLi$, and $(C_2F_5SO_2)_2NLi$.

5. A nonaqueous electrolyte cell comprising:
   a cathode,
   an anode comprising lithium or an anode material capable of storing and releasing lithium, and
   the electrolyte for nonaqueous electrolyte cells as claimed in claim 1 is used.

6. The electrolyte for nonaqueous electrolyte cells as claimed in claim 1, wherein addition of the second compound group is in a range of 0.01-10.0 mass % relative to the electrolyte for nonaqueous electrolyte cells.

* * * * *